United States Patent Office 3,505,698
Patented Apr. 14, 1970

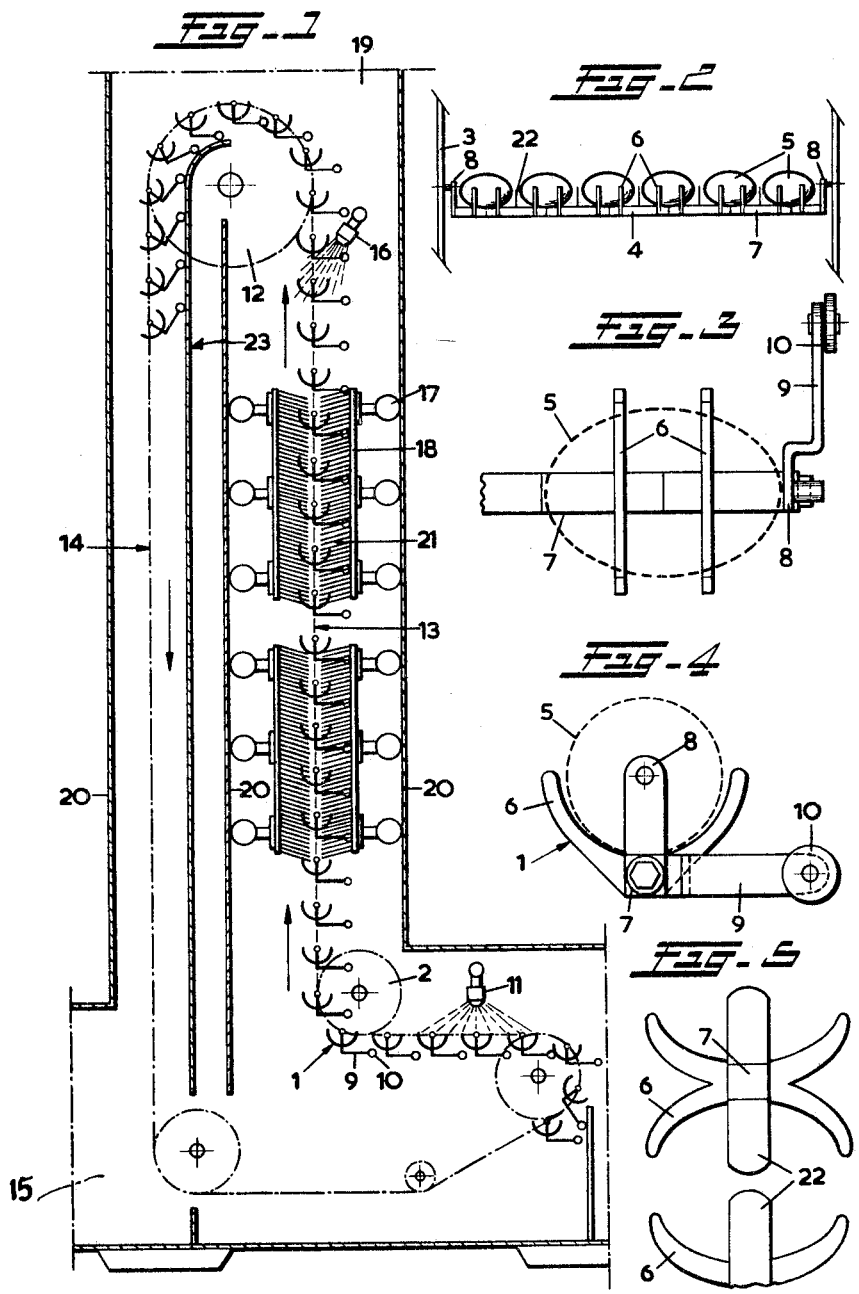

3,505,698
MACHINE FOR WASHING EGGS
Jelle van der Schoot, Aalten, Netherlands, assignor to Van Katwijk's Industrieen N.V., Aalten, Netherlands, a corporation of the Netherlands
Filed Dec. 6, 1967, Ser. No. 688,581
Claims priority, application Netherlands, Dec. 8, 1966, 6617256
Int. Cl. A01k 43/00
U.S. Cl. 15—3.13                                                 11 Claims

ABSTRACT OF THE DISCLOSURE

A machine for washing and drying eggs, comprising a first, laterally closed tower housing a vertically rising run of a conveyor for moving successive series of eggs, brushes disposed on opposite sides of said conveyor along a substantial length thereof, the bristles of said brushes extending into the path of travel of the eggs to brush along the surfaces thereof as the eggs move past said brushes, and spraying means adapted to moisten said bristles with hot washing liquid from above; and a second laterally closed tower housing a downcoming run of said conveyor, said first and second towers communicating at their tops with a common discharge conduit through which vapour generated from the hot washing liquid is removed from said first tower and a stream of air is maintained in said second tower countercurrently to the downwardly travelling eggs therein to dry the eggs and remove moist air therefrom.

---

This invention relates to an apparatus for washing eggs. Such machines have been introduced on the market in several designs. In these known washing devices, the eggs are advanced in a horizontal direction by means of a conveyor, while hot washing liquid is sprayed on to them from above by means of spray nozzles. In some of the known egg washing machines, the cleaning effect of the washing liquid is augmented by rapidly moving brushes.

These known egg washing machines have the disadvantage that the hot washing liquid discharged by the spray nozzles only passes one single layer of eggs. Therefore, they either employ this washing liquid uneconomically or require a pumping system for returning the spent washing liquid to the spray nozzles with the inherent disadvantage that the cleaning operation is effected with liquid which is already polluted and infected with bacteria. In addition, these washing machines occupy much room. Another disadvantage of them is that all vapour generated from the hot washing liquid remains in the machine and escapes from it together with the eggs, at least at about the same level, so that the metal of sorting machines following the washing machine is exposed to the corrosive effect of such vapour. This disadvantage is insufficiently alleviated by drying the eggs after they have been washed by blowing heated or unheated air against the eggs.

It is an object of the present invention to obviate these disadvantages. Accordingly to the invention, the eggs are washed whilst the eggs are moved in successive series vertically upwardly by a conveyor, the eggs on opposite sides of the upwardly-moving series being engaged by brushes, the bristles of which are moistened with hot washing liquid sprayed on to the latter from above. By virtue of this arrangement, a large number of eggs is washed under counter-current conditions, with the same limited quantity of washing liquid, which can thereafter be discharged without being wasted, so that re-cycle systems are not necessary. Also, on account of its vertical construction, the washing machine thus occupies little room.

The washing machine according to the invention is of the kind which does not employ the force of spray jets for the cleaning. The washing liquid is delivered to the higher positioned brushes rather than to the eggs. Owing to the vertical arrangement of the brushes, the liquid flows downwardly from brush to brush and the eggs are moistened by the brushes.

During transport, the eggs are supported on, or retained in, carriers suspended from conveyor chains. The part of such a carrier which engages the eggs consists of arcuate strips of thin material, in which the egg comes to bear with its longitudinal axis transversely of the strips. The carriers accordingly leave the major part of the surface of the egg exposed, which consequently can be operated upon by the brushes as to about 300° of its circumference. This feature is also of importance for the drying treatment following the washing treatment.

According to the invention, the conveyor moves through a laterally closed tower, two opposite walls of which carry the brushes, either directly or through the intermediary of brackets, suitable bearings, or brush carriers arranged for reciprocating movement longitudinally of the conveyor by means of eccentrics.

According to the invention, the drying treatment is also effected under counter-current conditions, for which purpose a stream of air is caused to move upwardly along a downcoming branch of the conveyor which via reversing means links up with the rising branch of the conveyor and moves downwardly through a second laterally closed tower. At their upper ends the two towers communicate with a common discharge conduit, to which vacuum is applied to remove the vapour laden air and the moisture clinging to the eggs. The drying of the eggs by means of air which is sucked away from the zone at which the washed eggs are delivered to a sorting machine following the washing machine has the additional advantage that such zone is ensured to remain free of moisture and vapour, the latter being directly removed from the upper end of the rising branch, so that it will never reach such zone.

One embodiment of the invention will now be described, by way of example, with reference to the accompanying diagrammatic drawings, in which FIG. 1 is a sideview of the apparatus according to the invention;

FIG. 2 is a sideview of a carrier for six eggs;

FIG. 3 is a plan view, on a larger scale, of a part of the carrier;

FIG. 4 is an end view, on the same scale, of the carrier;

FIG. 5 is an end view of a modification of the carrier.

Referring to the drawings, the eggs to be washed are fed, either by hand or by a feeding conveyor, to a horizontal input branch of a chain conveyor 1, over which input branch are disposed spray nozzles 11, which thoroughly wet the eggs to soak dirt clinging to them.

The conveyor 1 comprises two chains 3 lapped over sprockets 2 and rockingly supporting egg carriers 4, uniformly spaced along the chains. In the embodiment as shown, each carrier 4 is adapted to carry six eggs 5 spaced transversely of the conveyor.

In the embodiment shown in FIGS. 1–4, each egg is seated in two juxtaposed arcuate strips 6 with its longitudinal axis transversely of the conveyor. The middle part of the strips 6 of all the six egg seats of a carrier are interconnected by means of a cross-bar 7, which at its ends is provided with arms 8, by means of which the carrier is suspended from the chains 3 for rocking movement, such that the rocking axis is located adjacent to the centres of the semicircular strips, and with transversely projecting spacers 9, which carry guide rolls 10 at their free ends, whose purpose will be described hereinafter. Partition means 22, adapted to the shape of the eggs, extend upwardly from the cross-bars between each pair of adjacent seats.

From the horizontal feed-in branch, the conveyor curves upwardly while the rocking carriers laden with eggs retain their spatial position with the cross-bar 7 approximately right under the pivoting axis. The conveyor continues its vertically upward movement through a tower which is laterally closed. At the upper end of this tower there is disposed a reversing device 12, where the rising branch 13 of the conveyor passes into a downcoming branch 14, also enclosed in a laterally closed tower, the downcoming branch taking the eggs to the outlet 15 of the washing machine, where the eggs are delivered, for example, to the roller track of the feed-in table of a sorting machine. It may be of advantage to give the downcoming branch and its tower, unlike the truly vertical position of the rising branch, a position which is slightly inclined relative to the vertical, whereby it is achieved that if an egg is broken its contents cannot soil all of the subjacent, already washed eggs.

The opposite walls 20 of the tower, located on opposite sides of the plane of the conveyor, carry series of brushes 21, either directly or through the intermediary of supporting elements, such as brush carriers reciprocating by means of eccentrics, the rather long and rigid bristles of which brushes sweep along and around the eggs carried by the conveyor, to remove the dirt therefrom. In the embodiment shown in FIG. 1, the brushes are mounted on supporting elements 18, which are secured to the walls of the tower through brackets 17. At the upper end of the tower enclosing the rising branch of the conveyor, the brushes are abundantly moistened by means of spray nozzles 16. The washing liquid, which is continuously delivered by the spray nozzles at a temperature of about 50° C., runs down from one brush to the other, i.e. counter-currently to the direction of movement of the eggs, so that the temperature at the surface of the eggs will increase during the treatment, which is obviously of advantage, while the liquid further flows along the brushes to the eggs to keep their surface wet. It is also possible to use fast rotating brushes, in which case the washing liquid is thrown from the brushes into the adjacent brushes or is returned to the brushes via inclined baffles.

The two towers, respectively enclosing the rising and the downcoming branch of the conveyor, are at their top in communication with a common discharge conduit 19, in which there is provided a suction fan, not shown, which maintains an upward draught through the two towers to remove vapour generating from the washing liquid from the tower enclosing the rising branch 13, and moist air and moisture from the eggs from the tower enclosing the downcoming branch 14, so that the eggs arrive at the outlet 15 in dry condition and no moisture can reach said outlet.

In order to stabilize the position of the egg carriers in the rising and downcoming branches of the conveyor, the guide rollers 10 are supported against the wall 20 of the tower or against guide elements carried by said wall, such as, for example, at 23. In the tower enclosing the rising branch 13, the spacing between the plane of the conveyor chains and the guide elements if any is such that the carriers are stabilized in approximately their natural position of equilibrium, in which the cross-bar 7 is virtually under the pivoting axis of the carrier. In the tower enclosing the downcoming branch 14, however, such spacing has been selected smaller, as a consequence of which the guide rollers 10 are forced towards the plane of the conveyor chains, so that the carriers are tilted a little and a greater part of the surface of the eggs is exposed, entirely free from the conveyor, to the rising stream of air.

In the embodiment illustrated in FIG. 5, the carriers are not of the rocking kind, and the eggs are not loosely supported in their seats but positively retained therein. To this effect, the cross-bars 7 are at their ends secured to the chains 3 so as to be restrained from rotation, and each egg seat is formed by two juxtaposed pairs of arcuate strips 6, the strips in each pair extending towards each other from two adjacent cross-bars 7, the pairs being located in mutually parallel planes. The four strips together embrace the egg over such a part of its circumference that when the strips are moved towards each other on one side of the bars 7, an egg can just pass between the ends of the strips on the other side of the bars. In this embodiment the eggs can only be introduced into, and removed from, the egg carriers on the outside of a bend in the conveyor.

I claim:

1. In an apparatus for washing eggs, the arrangement comprising a conveyor for moving eggs in successive series vertically upwardly, and brushes disposed on opposite sides of said conveyor along a substantial length thereof, the bristles of said brushes extending into the path of the eggs to sweep along the surfaces thereof as the eggs travel upwardly along the brushes, and spraying means adapted to moisten said bristles with washing liquid from above.

2. In an apparatus for washing eggs, the arrangement comprising a conveyor for moving eggs in successive series vertically upwardly, said conveyor comprising a plurality of egg carrying means each adapted to carry a single line of eggs in spaced end-to-end relationship with their longitudinal axes in horizontal position, the arrangement further comprising brushes disposed on opposite sides of said conveyor along a substantial length thereof, the bristles of said brushes extending into the path of travel of the eggs to sweep along the surfaces thereof as the eggs travel upwardly along the brushes, and spraying means adapted to moisten said bristles with washing liquid from above.

3. In an apparatus for washing eggs, the arrangement comprising a conveyor for moving eggs in successive series vertically upwardly, said conveyor comprising spaced, parallel conveyor chains supporting between them a plurality of spaced, horizontally extending bars each carrying a plurality of generally vertical arcuate strips connected to said bars by their middle portions, said bars and said strips constituting a plurality of egg carrying means each adapted to carry a single line of eggs in spaced end-to-end relationship with their longitudinal axes in horizontal position, the arrangement further comprising brushes disposed on opposite sides of said conveyor along a substantial length thereof, the bristles of said brushes extending into the path of travel of the eggs to brush along the surfaces thereof to remove dirt therefrom as the eggs travel upwardly along the brushes, and spraying means adapted to moisten said bristles with washing liquid from above.

4. The arrangement as claimed in claim 3, wherein each egg has a seat constituted by a pair of strips located in spaced parallel planes and by partition members provided between two adjacent seats, said members extending from the bars in the same direction as the strips and being adapted to the shape of the eggs.

5. A machine for washing eggs, comprising a laterally closed tower housing at least one conveyor for moving eggs in successive series vertically upwardly, and brushes disposed on opposite sides of said conveyor along a substantial length thereof, the bristles of said brushes extending into the path of the eggs to sweep along the surfaces thereof as the eggs travel upwardly along the brushes, and spraying means adapted to moisten said bristles with washing liquid from above.

6. A machine as claimed in claim 5, wherein the brushes are carried by two opposite lateral walls of said tower.

7. The arrangement as claimed in claim 2, wherein the conveyor is housed in a laterally closed tower.

8. The arrangement as claimed in claim 3, wherein the conveyor is housed in a laterally closed tower.

9. A machine for washing and drying eggs, comprising a first, laterally closed tower housing a vertically rising run of a conveyor for moving successive series of eggs, brushes disposed on opposite sides of said conveyor along a substantial length thereof, the bristles of said brushes extending into the path of travel of the eggs to brush along the surfaces thereof as the eggs move past said brushes, and spraying means adapted to moisten said bristles with hot washing liquid from above; and a second laterally closed tower housing a downcoming run of said conveyor, said first and second towers communicating at their tops with a common discharge conduit through which vapour generated from the hot washing liquid is removed from said first tower and a stream of air is maintained in said second tower countercurrently to the downwardly travelling eggs therein to dry the eggs and remove moist air therefrom.

10. A machine according to claim 9, wherein the conveyor comprises a plurality of egg carrying means each adapted to carry a single line of eggs in spaced end-to-end relationship with their longitudinal axes in horizontal position.

11. A machine according to claim 9, wherein the conveyor comprises spaced, parallel conveyor chains supporting between them a plurality of generally vertical arcuate strips connected to said bars by their middle portions, said bars and said strips constituting a plurality of egg carrying means each adapted to carry a single line of eggs in spaced end-to-end relationship with their longitudinal axes in horizontal position.

References Cited
FOREIGN PATENTS 1,463,196  11/1966  France.

EDWARD L. ROBERTS, Primary Examiner